United States Patent
Kuo et al.

(10) Patent No.: US 6,444,781 B1
(45) Date of Patent: Sep. 3, 2002

(54) POLYESTER RESIN INTERMEDIATE COMPOSITIONS AND PREPARATION AND USES THEREOF

(75) Inventors: Thauming Kuo, Kingsport; Jeffery E. G. Powell, Blountville, both of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/594,801

(22) Filed: Jun. 16, 2000

Related U.S. Application Data

(60) Provisional application No. 60/140,998, filed on Jun. 29, 1999.

(51) Int. Cl.$^7$ ............................................. C08G 63/68
(52) U.S. Cl. ..................... 528/295; 528/274; 528/302; 528/308; 528/308.6; 525/437; 525/440; 525/444; 524/601; 524/604; 524/801; 428/482
(58) Field of Search ........................... 528/274, 295, 528/302, 308, 308.6; 525/437, 440, 444; 524/601, 604, 801; 428/482

(56) References Cited

U.S. PATENT DOCUMENTS

| | | | |
|---|---|---|---|
| 3,075,952 A | 1/1963 | Coover et al. | 260/75 |
| 3,345,313 A | 10/1967 | Ruhf et al. | 260/22 |
| 4,698,391 A | 10/1987 | Yacobucci et al. | 525/162 |
| 4,737,551 A | 4/1988 | Dervan et al. | 525/440 |
| 4,973,656 A | 11/1990 | Blount | 528/272 |
| 5,218,042 A | 6/1993 | Kuo et al. | 524/601 |
| 5,349,010 A | 9/1994 | Kuo | 524/600 |
| 5,349,026 A | 9/1994 | Emmons et al. | 525/328.6 |
| 5,371,148 A | 12/1994 | Taylor et al. | 525/293 |
| 5,378,757 A | 1/1995 | Blount, Jr. et al. | 524/608 |

FOREIGN PATENT DOCUMENTS

| | | |
|---|---|---|
| DE | 196 29 430 | 1/1998 |
| EP | 0 364 331 | 4/1990 |

OTHER PUBLICATIONS

Backus, J.K., *High Polymers*, 29, pp. 642–680 (1977).

*Primary Examiner*—Samuel A. Acquah
(74) *Attorney, Agent, or Firm*—Bernard J. Graves; Eastman Chemical Company

(57) ABSTRACT

The invention relates to resin intermediates and their preparation. The invention also relates to hydroxyl-functional, water-dispersible polymers formed from the intermediates and compositions containing the water-dispersible polymers. A preferred composition of the invention is a zero volatile organic content (VOC), ambient-cure enamel composition which contains a hydroxyl-functional, water-dispersible polyester.

6 Claims, No Drawings

POLYESTER RESIN INTERMEDIATE COMPOSITIONS AND PREPARATION AND USES THEREOF

CROSS REFERENCE TO RELATED APPLICATIONS

This application claims benefit of priority under 35 U.S.C. §119(e) to U.S. Provisional Application No. 60/140,998 filed on Jun. 29, 1999, which is herein incorporated in its entirety by reference.

BACKGROUND OF THE INVENTION

1. Field of the Invention

The invention relates to resin intermediates and their preparation. The invention also relates to hydroxyl-functional, water-dispersible polymers formed from the intermediates and compositions containing the water-dispersible polymers. A preferred composition of the invention is a zero volatile organic content (VOC), ambient-cure enamel composition which contains a hydroxyl-functional, water-dispersible polyester.

2. Background of the Invention

Industrial coatings, such as paints, have commonly employed solvent systems as a means to disperse polyester and polyacrylic coating resins. Due to the presence of volatile organic solvents, these industrial coatings are often detrimental to the environment. In an effort to limit the amounts of these volatile solvents and prevent environmental damage, recent regulations have encouraged the development of water-dispersible polyester coating compositions.

Water-dispersible polyesters have numerous applications, such as in the preparation of enamel and other coating compositions. Typically, a polyester is rendered water-dispersible by neutralizing residual carboxylic acid groups on the polyester with amines. Generally, water-dispersible polyesters have an acid number of 50 or greater so that they readily disperse in water. Unfortunately, such water-dispersible polyesters have not proven entirely satisfactory. For example, coatings prepared with these resins often exhibit poor water resistance due to the presence of carboxyl groups and residual amine. Also, the presence of the residual amines may cause odor and yellowing problems in ambient-cure systems.

To ameliorate the problems with amine neutralized polyesters, polyester resins formed from 5-(sodiosulfo)-isophthalic acid (5-SSIPA) have been widely investigated for the production of water-resistant coatings. Typically, these 5-SSIPA resins are hydroxyl-functionalized and possess very low acid numbers, generally less than 5. As a result of their low acid number, 5-SSIPA resins do not require amines to make them water-dispersible. Due to the absence of the residual amine groups, coatings prepared from 5-SSIPA resins are generally odor-free and demonstrate improved water resistance. In addition, 5-SSIPA resins and coatings made from them generally do not require the presence of an organic solvent, thereby making them less detrimental to the environment.

Unfortunately, previous attempts at forming polyesters by directly copolymerizing 5-SSIPA monomers with glycols and dicarboxylic acids have proven problematic. For example, when using the sodium salt of a 5-SSIPA monomer, the presence of the salt can lead to hazy resins due to the poor solubility of these salts in the polymerization reaction mixture. This problem becomes particularly apparent when attempting to incorporate a higher ratio of 5-SSIPA into the resin. Another problem with using 5-SSIPA is that when it is copolymerized with a diol and a dicarboxylic acid in a resin synthesis reaction, the 5-SSIPA molecules often end up at ends of the polyester chains, causing the final resin to have a high acid number. Resins having such a relatively high acid number may lead to stability problems.

Attempts have been made to resolve the problems relating to the formation of polyesters containing 5-SSIPA monomers. For example, U.S. Pat. No. 5,218,042 relates to polyesters containing 5-SSIPA monomers that have been formed from sulfomonomers which have their carboxylic acid groups capped with a glycol prior to polymerization of the polyester. Typically, when capping the carboxylic acid groups of the sulfomonomers, a large excess of glycol is employed. When using large excesses of glycol, the glycol has a tendency to enter the gaseous phase. The removal of a gaseous glycol component may cause problems for a polyesterification apparatus.

In addition to water-dispersible polyesters, sulfomonomers have been used to form water-dissipatible alkyl resins for cross-linked coatings. For example, U.S. Pat. No. 5,378,757 discloses reacting at least one monoglyceride, a polycarboxylic acid, and a polyol sulfomonomer adduct containing at least one sulfonate group.

Previous attempts at forming resin intermediates from glycol components and difunctional sulfomonomers have not been fully optimized for full scale industrial production. One problem occurring in previous resin intermediates is that typically large excess amounts of the glycol component are reacted with the difunctional sulfomonomer in order to avoid the presence of unreacted difunctional sulfomonomer. Yet, resin intermediates which contain large amounts of excess glycol component restrict the types of polyesters which can be formed from the resin intermediates.

There exists a need in the art for a versatile resin difunctional sulfomonomer resin intermediate that could be produced on an industrial scale. It is desired that such resin intermediates are capable of being isolated and stored for later usage in various waterborne syntheses, such as the formation of water-dispersible polyesters.

SUMMARY OF THE INVENTION

The invention relates to polyester difunctional sulfomonomer intermediate resins. More particularly, the invention provides intermediate resins which are substantially free of unreacted, difunctional sulfomonomer particles and which may be isolated as solids and formed into loose solid forms, such as powders. These powders may be conveniently stored without caking. When desired, the intermediate resins can be easily reacted with a glycol component and a dicarboxylic acid component to form polyester resins having high levels of difunctional sulfomonomers.

More specifically, the invention relates to resin intermediates comprising the reaction products of a glycol component and a difunctional sulfomonomer, wherein the resin intermediate formed is substantially free of unreacted difunctional sulfomonomer particles. Preferably the resin intermediate is in the form of a solid, such as a powder and is storage stable, i.e., does not noticeably degrade, at room temperature.

Another embodiment of the invention relates to processes for forming the resin intermediates. One such process for forming a resin intermediate involves forming a slurry of a glycol component, a difunctional sulfomonomer and water. While in the form of a slurry, the glycol component and the difunctional sulfomonomer are reacted to form a resin intermediate, such that the resin intermediate is substantially free of unreacted difunctional sulfomonomer particles.

The invention also relates to water-dispersible polymers, such as polyesters and alkyds, which are made from the intermediate resins. Preferably, the water-dispersible polymers are hydroxyl-functional, water-dispersible polyesters. These water-dispersible polyesters are formed from about 8 to about 16 mole percent of a resin intermediate, about 35 to about 55 mole percent of at least one polyol component, and about 30 to about 50 mole percent of a diacid component. These water-dispersible polyesters can be used in a variety of applications, such as VOC free aqueous dispersions.

DETAILED DESCRIPTION OF THE INVENTION

The invention relates to resin intermediates, their preparation and water-dispersible polymers formed from the resin intermediates. The invention also relates to compositions which contain the water-dispersible polymers, for example, volatile organic content free coating compositions.

Resin Intermediate

The resin intermediates of the invention are typically, substantially free of unreacted, difunctional sulfomonomer particles. Preferably, the resin intermediates may be isolated as solids and formed into loose solid forms, such as powders which may be stored without appreciable caking. With the resin intermediates of the invention it is possible to form polymers, such as polyesters, with a higher difunctional sulfomonomer content without the accompanying haze, unreacted sulfomonomer or sedimentation that can occur with previous sulfomonomer containing polyesters. The resin intermediates may be used to form water-dispersible dispersible polymers, such as water-dispersible polyesters and alkyds.

The formation of resin intermediates which may be stored for later use allows for economies of scale in forming the resin intermediates. Whereas intermediate resins of difunctional monomers are generally made in small quantities in the first stage of the reaction, the present invention allows for large scale production of resin intermediates which may be stored for later use. Thus, the invention avoids the problems associated with selecting an appropriate apparatus and maintaining proper temperature and atmospheric controls when conducting a first, small scale reaction for forming an intermediate which is followed by a subsequent large scale polymerization reaction involving only small quantities of the intermediate resin.

The resin intermediates of the invention comprise the reaction products of a glycol component and a difunctional sulfomonomer. Generally, the resin intermediate formed is substantially free of unreacted difunctional sulfomonomer particles. Furthermore, when storage is desired, the resin intermediate is in the form of a solid, such as a powder. The solid intermediate resins of the invention are typically storage stable, i.e., does not noticeably degrade, at room temperature and may be employed in the formation of water-dispersible polyesters, days, weeks and even months after the resin intermediate was formed.

Generally, when forming the resin intermediate, the ratio of glycol component to difunctional sulfomonomer varies from about 75 to about 85 mole percent glycol component and about 15 to about 25 mole percent of a difunctional sulfomonomer based on the total moles of diol and sulfomonomer. Preferably, the glycol is about 78 to about 83 mole percent and the difunctional sulfomonomer is about 17 to about 22 mole percent. More preferably, the glycol is about 81 mole percent and the difunctional sulfomonomer is about 19 mole percent.

The glycol component of the invention may be a glycol or mixture of glycols. The glycol component may be an aliphatic, alicyclic, an aralkyl glycol or mixture thereof. Suitable glycols are described in U.S. Pat. Nos. 4,973,656, 5,218,042, and 5,378,757. Examples of suitable glycols include, but are not limited to, ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 2-butyl-2-ethylpropanediol, neopentyl glycol, 2,2,4-trimethyl-1,3-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol and p-xylylenediol. Examples of other suitable glycols are poly(ethylene glycols) which include, but are not limited to, diethylene glycol, triethylene glycol, tetraethylene glycol, and pentaethylene, hexamethylene, heptaethylene, octaethylene, nonaethylene, and decaethylene glycols, and mixtures thereof. Preferred glycols include neopentyl glycol, 2-butyl-2-ethylpropanediol, 2,2,4-trimethyl-1,3-pentanediol, and hydroxypivalyl hydroxypivalate. The most preferred glycol is neopentyl glycol.

The difunctional sulfomonomer of the invention may be a diacid or derivative thereof, containing a —$SO_3M$ group where M is a metal ion. Suitable difunctional sulfomonomers are described in U.S. Pat. Nos. 4,973,656, 5,218,042, and 5,378,757. The metal ion (M) of the sulfonate salt group may be $Na^+$, $Li^+$, $K^+$, $Mg^{++}$, $Ca^{++}$, $Cu^{++}$, $Fe^{++}$, or $Fe^{+++}$. Preferably, the metal ion is a monovalent cation.

The —$SO_3M$ group may be attached to an aromatic nucleus such as, for example, benzene, naphthalene, anthracene, diphenyl, oxydiphenyl, sulfonyldiphenyl, and methylenediphenyl. Examples of suitable difunctional sulfomonomers include, for example, a sodium salt of a sulfoterephthalic acid, 5-sulfoisophthalic acid, sulfophthalic acid, 4-sulfonaphthalene-2,7-dicarboxylic acid, dimethyl 5-sulfoisophthalic acid or a derivative of such acids. Preferably, the difunctional sulfomonomer is 5-(sodiosulfo)-isophthalic acid, 5-(lithiosulfo)-isophthalic acid, or methyl esters thereof. The most preferred difunctional sulfomonomer is 5-(sodiosulfo)-isophthalic acid.

The resin intermediates of the invention typically have an acid number of less than about 10 mg KOH/g, preferably, less than about 5 mg KOH/g, more preferably, less than about 2 mg KOH/g. Typically, the melting point of the resin intermediate ranges from about 35° C. to about 80° C., preferably, ranging from about 40° C. to about 60° C., and most preferably, ranging from about 40° C. to about 50° C.

The resin intermediates may be prepared by combining the desired amounts of difunctional sulfomonomer and glycol component in a reaction vessel each as described herein. Preferably, the reaction is conducted in the presence of an acid catalyst. Suitable acid catalysts are well known in the art. Preferably, the catalyst is an organo-metallic compound such as, for example, a tin compound. Preferred acid catalysts include Fascat 4100, dibutyltinoxide, stannous oxalate, and butylstannoic acid.

When forming the resin intermediate, it is preferred that a sufficient amount of water is added to the reaction vessel to form a slurry. The slurry is heated, with agitation, to a first temperature, typically up to about 160° C., in order to remove water. It is preferred that the reaction mixture be heated to about 90° C. and then slowly raised to a temperature of about 160° C. at a rate of about 2–5° C./min. When a sufficient amount of water is removed, the reaction mixture is heated at a higher second temperature, typically up to about 200° C. and preferably about 160° C. to about 190° C. The reaction mixture is heated until a clear solution is formed and a resin intermediate composition having an acid number less than about 10 mg KOH/g, preferably less than about 5 mg KOH/g, and more preferably less than about 2 mg KOH/g, is obtained.

The heating steps, are preferably conducted in an inert atmosphere, such as with a nitrogen sparge. It was found, for example, that adequate mixing and slow heating aids the reaction in the earlier stage since the reaction mixture becomes very thick as water is removed. Failure to adequately stir and heat the mixture may result in localized overheating which can cause the resin intermediate to become scorched and discolored. Therefore, a reactor equipped with a steam coil line or other means of slow heating is preferred such that the reaction temperature is controlled and the reaction mixture does not overheat.

Water-dispersible Polymers

The resin intermediates of the invention are especially suited for forming water-dispersible polymers, i.e., polymers that disperse in water. Suitable water-dispersible polymers formed from the resin intermediates include, but are not limited to, water-dispersible polyesters and alkyds. Preferably, the resin intermediates of the invention are reacted with a diacid and a polyol to form water-dispersible polyesters.

The resin intermediates of the invention when reacted with a diacid and a polyol are capable of forming hydroxyl-functional, water-dispersible polyesters a having a relatively high sulfomonomer content. Generally, water-dispersible polyesters are formed as the reaction product of about 8 to about 16 mole percent resin intermediate, as described above, about 35 to about 55 mole percent of at least one polyol, and about 30 to about 50 mole percent of a diacid. Preferably, about 10 to about 14 mole percent of resin intermediate is reacted with about 40 to about 50 mole percent of polyol and about 40 to 50 mole percent of diacid.

Examples of suitable diacids include, but are not limited to, oxalic, malonic, dimethylmalonic, succinic, glutaric, adipic, trimethyladipic, pimelic, 2,2-dimethylglutaric, azelaic, sebacic, fumaric, maleic, itaconic, 1,3-cyclopentanedicarboxylic, 1,2-cyclohexanedicarboxylic, 1,3-cyclohexanedicarboxylic, 1,4-cyclohexane dicarboxylic, phthalic, terephthalic, isophthalic, 2,5-norbornanedicarboxylic, 1,4-naphthalic, diphenic, 4,4'-oxydibenzoic, diglycolic, thiodipropionic, 4,4'-oxydibenzoic, diglycolic, thiodipropionic, 4,4'-sulfonyldibenzoic, 4,4'-biphenyldicarboxylic, and 2,6-naphthalenedicarboxylic acids. Generally, the diacid is an aromatic dicarboxylic acid containing from about 8 to about 14 carbon atoms, an aliphatic dicarboxylic acid containing from about 4 to about 12 carbon atoms, or an anhydride, acid chloride or ester thereof. Preferred diacids include adipic acid, terephthalic acid, napthalenedicarboxylic acid, 1,4-cyclohexane dicarboxylic acid, isophthalic acid and esters thereof.

The polyol component is typically a glycol or a triol and may be the same glycol as that used to form the resin intermediate. Generally, the polyol may be, but is not limited to, ethylene glycol, propylene glycol, butanediol, pentanediol, hexanediol, 2-methylpropanediol, 1,3-propanediol, neopentyl glycol, 2,2,4-trimethyl- 1,3-propanediol, 3-methylpentanediol, 1,4-cyclohexanedimethanol, and the like. Other suitable polyols include, but are not limited to, trimethylolpropane, trimethylolethane, glycerol, and the like. Neopentyl glycol and trimethylolpropane are especially preferred polyols.

The hydroxyl-functional, water-dispersible polyesters of the invention typically have a hydroxyl number ranging from about 50 to about 200 mg/KOH. Furthermore, the polyesters have an acid number ranging from about 0 to about 30 mg KOH/g.

The hydroxyl-flnctional, water-dispersible polyester is prepared by conventional polyesterification methods, such as, for example, those described in U.S. Pat. No. 4,973,656. According to the invention, the polymerization may be conducted by heating, with agitation, a combination of the resin intermediate, the polyol, and the diacid, each as described above, under conditions sufficient to produce a hydroxyl-functional, water-dispersible polyester having a hydroxyl number ranging from about 50 to about 200 and an acid number less than about 30. Preferably, a mixture of the resin intermediate, the polyol, and the diacid is polymerized at a temperature ranging from about 170° C.–230° C. Preferably, the reaction is conducted under an inert atmosphere (e.g. nitrogen). An acid catalyst, as described herein, may also be used in the polymerization to form the hydroxyl-functional, water-dispersible polyester.

The water-dispersible polymers of the invention may be dispersed in water by adding water, preferably dropwise, until an aqueous dispersion is formed. Aqueous dispersions of water-dispersible polymers of the invention are useful for a wide variety of applications including, for example, coating compositions such as waterborne enamel compositions.

By forming an aqueous dispersion of water-dispersible polymers of the invention, a waterborne enamel composition may be formed. Such as waterbome enamel composition typically contains about 15 to about 50 weight percent of a hydroxyl-functional, water-dispersible polymer as described above, about 45 to about 70 weight percent water, and about 3 to about 30 weight percent crosslinking agent. Preferably the hydroxyl-functional, water-dispersible polymer is a polyester. The waterbome enamel compositions may be essentially free of volatile organic compounds (VOCs), preferably having less than about 50 g/l VOCs and most preferably completely free of VOCs. The waterborne enamel compositions of the invention are preferably ambient-cure compositions.

Suitable crosslinking agents for an enamel composition include, but are not limited to, melamine-formaldehyde-type and isocyanate-type crosslinking agents, each as known in the art. Melamine-formaldehyde-type crosslinking agents have a plurality of —N(CH$_2$OR$_3$)$_2$ functional groups, wherein R$_3$ is a C$_1$–C$_4$ alkyl group, preferably, a methyl group. Examples of suitable crosslinking agents include, but are not limited to, 1,6-hexamethylene diisocyanate, methylene bis (4-cyclohexyl isocyanate), isophorone diisocyanate, 2,4-toluene diisocyanate, Bayhydur XP-7063 (BAYER)). hexamethoxymethylmelamine, tetramethoxymethylbenzoquanamine, tetramethoxymethylurea, and mixed butoxy/methoxy substituted melarnines. Most preferably, the crosslinking agent is a hydrophilic isocyanate (e.g., Bayhydur XP-7063 (BAYER)).

Blends of the inventive hydroxyl-flnctional, water-dispersible polyester and conventional waterbome polymers may be used in the enamel compositions of the invention. Examples of conventional waterbome polymers include, but are not limited to, polyesters, polyester-amides, cellulose esters, alkyds, polyurethanes, epoxy resins, polyamides, acrylics, and vinyl polymers, and the like.

The enamel composition may also comprise one or more of the following additives: one or more leveling, rheology, or flow control agents (such as silicones, fluorocarbons or cellulosics), extenders, reactive coalescing aids such as those described in U.S. Pat. No. 5,349,026, plasticizers, flatting agents, pigment wetting and dispersing agents and surfactants, ultraviolet (UV) absorbers, UV light stabilizers, tinting pigments, defoaming and antifoaming agents, anti-settling, anti-sag and bodying agents, anti-skinning agents, anti-flooding and anti-floating agents, fungicides and mildewcides, corrosion inhibitors, thickening agents, and coalescing agents.

Examples of flatting agents include, but are not limited to, synthetic silica, (available from the Davison Chemical Division of W. R. Grace & Company under the trademark SYLOID®), polypropylene (available from Hercules Inc., under the trademark HERCOFLAT®); and synthetic silicate (available from J. M. Huber Corporation under the trademark ZEOLEX®).

Examples of dispersing agents and surfactants include, but are not limited to, sodium bis(tridecyl) sulfosuccinnate, di(2-ethyl hexyl) sodium sulfosuccinnate, sodium dihexylsulfo-succinate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Other examples of thickeners include the methylene/ethylene oxide associative thickeners and water soluble carboxylated thickeners, such as those sold under the UCAR POLYPHOBE trademark by Union Carbide.

Several proprietary antifoaming agents are commercially available, for is example, under the trademark BRUBREAK of Buckman Laboratories Inc.; under the Byk®D trade name of BYK Chemie, U.S.A.; under the Foamaster® and Nopco® trademarks of Henkel Corp./Coating Chemicals; under the DREWPLUS® trademarks of the Drew Industrial Division of Ashland Chemical Company; under the TRYSOL® and TROYKYD® trademarks of Troy Chemical Corporation; and under the SAG® trademarks of Union Carbide Corporation.

Examples of fingicides, mildewcides, and biocides include, but are not limited to, 4,4-dimethyloxazolidine, 3,4,4-trimethyloxazolidine, modified barium metaborate, potassium N-hydroxy-methyl-N-methyldithiocarbamate, 2-thiocyanomethylthio)benzothiazole, potassium dimethyl dithiocarbamate adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include, but are not limited to, substituted benzophenone, substituted benzotriazoles, hindered amines, and hindered benzoates, available from American Cyanamid Company under the trademark CYASORB UV®, and diethyl-3-acetyl-4-hydroxy-benzyl-phosphonate, 4-dodecyloxy-2-hydroxy benzophenone, and resorcinol monobenzoate.

The enamel composition may also contain one or more pigments and/or fillers. If present, the combined concentration of pigments and/or fillers is preferably about 1 to about 70 weight percent of the composition. More preferably, the concentration is about 30 to about 60 weight percent.

Pigments suitable for use in the coating compositions envisioned by the present invention are the typical organic and inorganic pigments, well-known to one of ordinary skill in the art of surface coatings, especially those set forth by the *Colour Index,* 3d Ed., 2d Rev., 1982, published by the Society of Dyers and Colourists in association with the American Association of Textile Chemists and Colorists. Examples include, but are not limited to, CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines), CI Pigment Red 49:1, and CI Pigment Red 57:1.

Additional, specific examples of such additives can be found in *Raw Materials Index,* published by the National Paint & Coatings Association, 1500 Rhode Island Avenue, N.W., Wash., D.C. 20005, herein incorporated herein by reference in its entirety. Further examples of such additives and emulsion polymerization methodology may be found in U.S. Pat. No. 5,371,148.

Although the enamel composition preferably does not contain a VOC organic solvent, it may contain a water-miscible organic solvent and/or a coalescing agent. Such solvents and coalescing agents are well known in the art and include, for example, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, TEXANOL® ester alcohol (Eastman Chemical Company), and the like. Such solvents and coalescing aids may also include reactive solvents and coalescing aids such as, for example, diallyl phthalate, SANTOLINK XI-100® polyglycidyl allyl ether from Monsanto, and others as described in U.S. Pat. Nos. 5,349,026 and 5,371,148. See, for example, J. K. Backus, "High Polymers," Vol. 29, 1977, p. 642–680.

The enamel composition may be prepared by techniques known in the art as disclosed, for example, in U.S. Pat. Nos. 4,698,391, 4,737,551, and 3,345,313.

The enamel composition may be coated onto a substrate or article and cured using techniques known in the art. One known technique, for instance, is to spray about 3 to about 4 mils of wet coating onto a metal panel and heating it at about 150° C. in a forced air oven for about 30 minutes. Compositions of substrates useful in the invention include, but are not limited to, steel, aluminum, wood, gypsum board, or galvanized sheeting (both primed and unprimed). By way of example, any coating composition designed for industrial coatings, textile coatings, ink coatings, adhesives, or coatings for plastics are within the scope of the present invention and are included in the term "article." Thus, as a further aspect of the present invention, there is provided a shaped or formed article which has been coated with the coating compositions of the invention and dried.

The following examples will further illustrate the invention.

EXAMPLES

Example 1
Preparation of NPG/5-SSIPA Resin Intermediate (19 Mole Percent 5-SSIPA)

Into a 10-gallon reactor (Brighton/Trinity) equipped with steam-jacketed packed and unpacked columns, water-jacketed condenser, steam coil, nitrogen sparge, and nitrogen blanket were charged the following reactants: 11,808 g (113.5 mole) neopentyl glycol (NPG); 7,135 g (26.6 mole) 5-(sodiosulfo)isophthalic acid (5-SSIPA); and 16 g Fascat 4100, an acid catalyst. The nitrogen sparge and blanket rates were set at 0.4 standard cubic feet per hour (scfh).

A slurry was prepared by adding 1312 g water to the mixture and raising the temperature to 90° C. The slurry was then heated by the steam coil and held sequentially at 90–130° C. for 2 hours, 130–140° C. for 2 hours, and 140–150° C. hours at a heating rate of 2 degree/min. A total of 1086 g of the distillate was collected at this stage.

The mixture was then heated by furnace to 170–180° C. and held for 4 hours. Finally, the reaction was allowed to continue at 190° C. until an acid number of 1.5 mg KOH/g was obtained. The resulting viscous liquid was isolated neat and allowed to cool to give a solid product.

Example 2
Preparation of an NPG/5-SSIPA Polyester Resin Intermediate Composition (17 Mole Percent 5-SSIPA)

To a three-neck, round-bottom flask equipped with a mechanical stirrer, a steam-jacketed partial condenser, a Dean-Stark trap, a nitrogen inlet, and a water condenser were charged with 113.52 g (1.09 mole) NPG; 58.42 g (0.22 mole) 5-SSIPA; 0.15 g Fascat 4100; and 12.61 g water. The mixture was allowed to react first at 160° C. for 1 hour then at 190° C. until an acid number of 0.3 was obtained. The resulting viscous liquid was isolated neat and allowed to cool to give a solid product.

Comparative Example 1
Preparation of an NPG/5-SSIPA Polyester Resin Intermediate Composition (25 Mole Percent 5-SSIPA)

The reaction was carried out similarly as in Example 2 except that a 3:1 mole ratio of NPG:5-SSIPA was used (NPG 93.74 g, 5-SSIPA 80.40 g). A clear reaction mixture was not obtained as the mixture contained a significant amount of unreacted 5-SSIPA throughout the reaction.

Comparative Example 2
Preparation of an NPG/5-SSIPA Polyester Resin Intermediate Composition (14 Mole Percent 5-SSIPA)

The reaction was carried out similarly as in Example 2 except that a 6:1 mole ratio of NPG:5-SSIPA was used (NPG 120.52 g, 5-SSIPA 51.68 g). A solid product was successfully isolated; however, extensive sublimation was observed during the reaction and the period when the product was cooling down after being isolated.

Example 3
Preparation of an Aqueous Dispersion of a Hydroxyl-Functional, Water-Dispersible Polyester To a three-neck, round-bottom flask equipped with a mechanical stirrer, a steam-jacketed partial condenser, a Dean-Stark trap, a nitrogen inlet, and a water condenser were charged with 58.40 g NPG/5-SSIPA obtained from Example 1; 113.44 g (1.09 mole) NPG; 12.08 g (0.09 mole) trimethylolpropane (TMP); 93.81 (0.57 mole) isophthalic acid (IPA); 82.52 g (0.57 mole) adipic acid (AD); and 0.35 g Fascat 4100. The mixture was heated and held for 1 hour each at 160° C., 180° C., and 200° C. The condensate (water) was collected in the Dean-Stark trap. The reaction was allowed to continue at 220° C. until an acid number of 0.8 was obtained. The resulting resin was allowed to cool to below 100° C. and 391 g water added dropwise to yield an aqueous dispersion with 43.3 percent solids.

Example 4
Zero-VOC Ambient-Cure Paint Formulation

The following mixture was formed: 46.20 g resin dispersion from Example 3, 10.00 g Bayhydur XP-7063 (a hydrophilic isocyanate obtained from BAYER, Pittsburgh, Pa), 0.03 g Silwet L-77 (a polyalkyleneoxide-modified heptamethyltrisiloxane obtained from OSI, Danbury, Conn.), and 0.02 g BYK-024 (a polypropylene glycol obtained from BYK-Chemie, USA, Wallingford, Conn.). The mixture was stirred by a mixer (DISPERMAT, by BYK-Chemie) while 18 g water was slowly added. After stirring for a few minutes, a homogeneous, milky paint was obtained. The paint had a 2–3 hour pot life.

The paint was drawn down on a cold-rolled steel test panel (B11000, ACT) and dried at room temperature for three hours (through dried), followed by forced-dry at 80° C. for 20 hours. The resulting coating exhibited the following properties.

| | |
|---|---|
| Gloss (60°/20°) (ASTM D523) | 94/96 |
| Pencil Hardness (ASTM D3363) | H |
| Impact Resistance (fwd/rvs) (ASTM D2794) | 160/160 lb-in |
| MEK Double Rubs (ASTM D1308) | 50 |

It should be understood that the foregoing discussion and examples merely present a detailed description of certain preferred embodiments. It will be apparent to those of ordinary skill in the art that various modifications and equivalents can be made without departing from the spirit and scope of the invention. All the patents, journal articles and other documents discussed or cited above are herein incorporated by reference.

What is claimed is:

1. A process for forming a resin intermediate comprising the steps of:
    forming a slurry of a glycol component, a difunctional sulfomonomer and water; and
    reacting said slurry to form a resin intermediate, wherein the resin intermediate formed is substantially free of unreacted difunctional sulfomonomer particles.

2. The process according to claim 1, wherein said reacting step is conducted at an elevated reaction temperature until a clear solution is formed and the resin intermediate has an acid number of less than about 10 mg KOH/g.

3. The process according to claim 1 further comprising the steps of:
    combining about 75 to about 85 mole percent of a glycol with about 15 to about 25 mole percent of a difunctional sulfomonomer, based on the total moles of diol and sulfomonomer, and an acid catalyst;
    adding a sufficient amount of water to the combination to form a slurry;
    heating said slurry, with agitation, to a first temperature to remove water; and
    heating said slurry to a second temperature to form a polyester resin intermediate having an acid number less than about 10 mg KOH/g.

4. The process of claim 3, wherein said glycol is selected from the group consisting of neopentyl glycol, 2-butyl-2-ethylpropanediol, 2,2,4-trimethyl-1,3-pentanediol, and hydroxypivalyl hydroxypivalate and said difunctional sulfomonomer is selected from the group consisting of 5-(sodiosulfo)-isophthalic acid, 5-(lithiosulfo)-isophthalic acid, and methyl esters thereof.

5. The process of claim 3, wherein said glycol is present in an amount of about 78 to about 83 mole percent and said difunctional sulfomonomer is present in an amount ranging from about 17 to about 22 mole percent.

6. The process of claim 3, wherein said glycol is present in an amount of about 81 mole percent and said difunctional sulfomonomer is present in an amount of about 19 mole percent and the resin intermediate has an acid number less than about 5 mg KOH/g.

\* \* \* \* \*